(12) United States Patent
Liao et al.

(10) Patent No.: US 9,153,997 B2
(45) Date of Patent: Oct. 6, 2015

(54) CHARGING DEVICE AND ASSOCIATED ELECTRICAL APPLIANCES

(71) Applicants: Wen-Yung Liao, Taipei Hsien (TW); Wen-Fu Liao, Taipei Hsien (TW); Sheng-Hsin Liao, Taipei Hsien (TW)

(72) Inventors: Wen-Yung Liao, Taipei Hsien (TW); Wen-Fu Liao, Taipei Hsien (TW); Sheng-Hsin Liao, Taipei Hsien (TW)

( * ) Notice: Subject to any disclaimer, the term of this patent is extended or adjusted under 35 U.S.C. 154(b) by 183 days.

(21) Appl. No.: 14/084,769

(22) Filed: Nov. 20, 2013

(65) Prior Publication Data

US 2014/0077759 A1 Mar. 20, 2014

Related U.S. Application Data

(63) Continuation-in-part of application No. 12/940,229, filed on Nov. 5, 2010, now abandoned.

(51) Int. Cl.
*H02J 7/00* (2006.01)
*H02J 7/02* (2006.01)

(52) U.S. Cl.
CPC ............... *H02J 7/025* (2013.01); *H02J 7/0042* (2013.01)

(58) Field of Classification Search
CPC .............. B60L 2200/18; B60L 2230/12; H01R 13/6392; H01R 31/02
USPC .................................................. 320/107–108
See application file for complete search history.

(56) References Cited

U.S. PATENT DOCUMENTS

| 7,579,809 B2 * | 8/2009 | Bowles et al. ................. 320/107 |
| 2012/0019207 A1 * | 1/2012 | Kuo et al. ..................... 320/111 |

\* cited by examiner

*Primary Examiner* — Nghia Doan
(74) *Attorney, Agent, or Firm* — Rosenberg, Klein & Lee

(57) ABSTRACT

A charging device and associated electrical appliances are provided. More than one electronic device can be charged simultaneously, with a wireless charging option available. Thus, the user has greater flexibility in selecting the desired charging option. Each associated appliance has a receiving compartment to hold the charging device, and the receiving compartment is configured with at least one first terminal. The charging device has at least one electrical interface for cable connection, a wireless charging transmitter, and at least one second terminal for mating electrically to the first terminal.

8 Claims, 9 Drawing Sheets

CHARGING DEVICE AND ASSOCIATED ELECTRICAL APPLIANCES

CROSS REFERENCE TO RELATED APPLICATIONS

This Application is a Continuation-in-Part of application Ser. No. 12/940,229, filed Nov. 5, 2010, now pending, and entitled Charging Device and Associated Electrical Appliances.

BACKGROUND OF THE INVENTION

1. Field of the Invention

The instant disclosure relates to a charging device and associated electrical appliances; in particular, a charging device and associated composite power strip, composite wall outlet assembly, and composite lighting structure.

2. Description of the Related Art

Utility power is often accessed through wall sockets. When portable electronics such as mobile phones, digital cameras, and PDAs (Personal Digital Assistant) need to be recharged, a charger is plugged into an electrical outlet to charge the mobile devices.

However, the use of cables can cause inconvenience to the users. Wireless charging would eliminate the need for cable connections.

In the Taiwan Publication No. 592378, titled "Universal Serial Bus Transformer", the inventor previously disclosed a transformer that supplies standard power source. The user would not require to purchase device-specific transformers. However, the transformer can not perform wireless charging.

To resolve the above shortcoming, the inventor proposes the following solution.

SUMMARY OF THE INVENTION

The object of the instant disclosure is to provide a charging device and associated electrical appliances, where charging can be performed using cable connection and wireless method.

To achieve the above object, the instant disclosure provides a composite power strip, which includes a housing having a body, which has at least one electrical outlet, where the electrical outlet is wired to a power source, and a receiving compartment is formed upon the body, with the receiving compartment having at least one first terminal; and a charging device having at least one electrical interface, a wireless charging transmitter, and at least one second terminal, where the charging device is removably attached to the receiving compartment, with the second terminal connecting electrically to the first terminal.

The instant disclosure also provides a composite wall outlet assembly, which includes a housing having a body, with at least one electrical outlet positioned thereupon, where a receiving compartment is defined by the body, and the receiving compartment has at least one first terminal; and a charging device having at least one electrical interface, a wireless charging transmitter, and at least one second terminal, where the charging device is removably attached to the receiving compartment, with the second terminal connecting electrically to the first terminal.

The instant disclosure further provides a composite lighting structure. The composite lighting structure has a base, which defines a receiving compartment having at least one first terminal; a light source attached to the base; and a charging device having at least one electrical interface, a wireless charging transmitter, and at least one second terminal, where the charging device is removably attached to the receiving compartment, with the second terminal connecting electrically to the first terminal.

The instant disclosure still further provides a charging device having at least one electrical interface, a wireless charging transmitter, and at least one first terminal.

The instant disclosure presents the following advantages. First, the charging device can charge one or more electronic device via the electrical interface, and also provides wireless charging to an electronic device having a wireless charging receiver. Second, a bad charging device can be discarded from the electrical appliance body for replacement purpose. Similarly, the wireless charging transmitter can be replaced separately from the charging device also. For cost-effectiveness, the electrical appliance itself can be saved by only replacing the bad charging device or transmitter.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
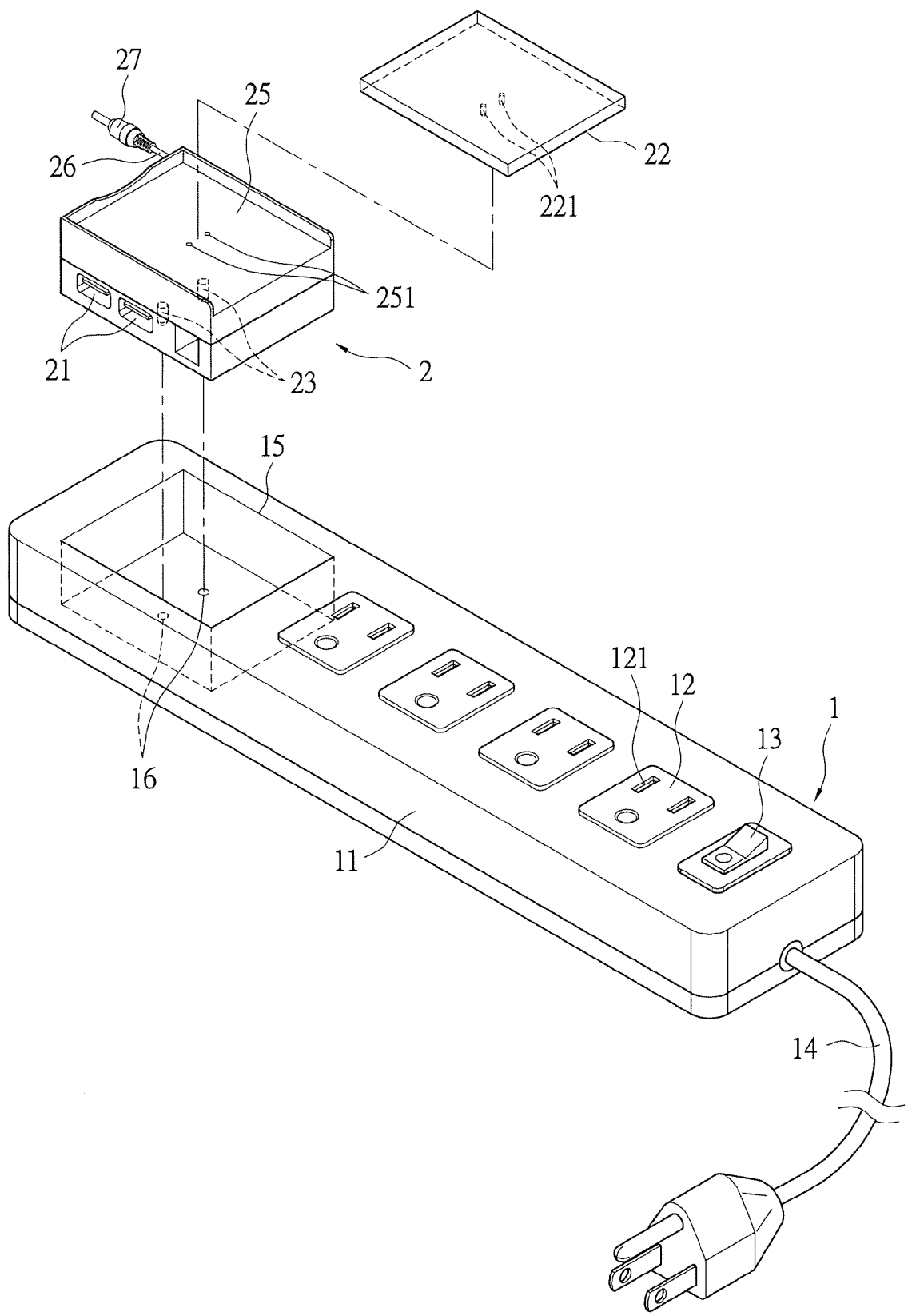
FIG. 1 shows an exploded view of a composite power strip of the first embodiment.
Figure 2:
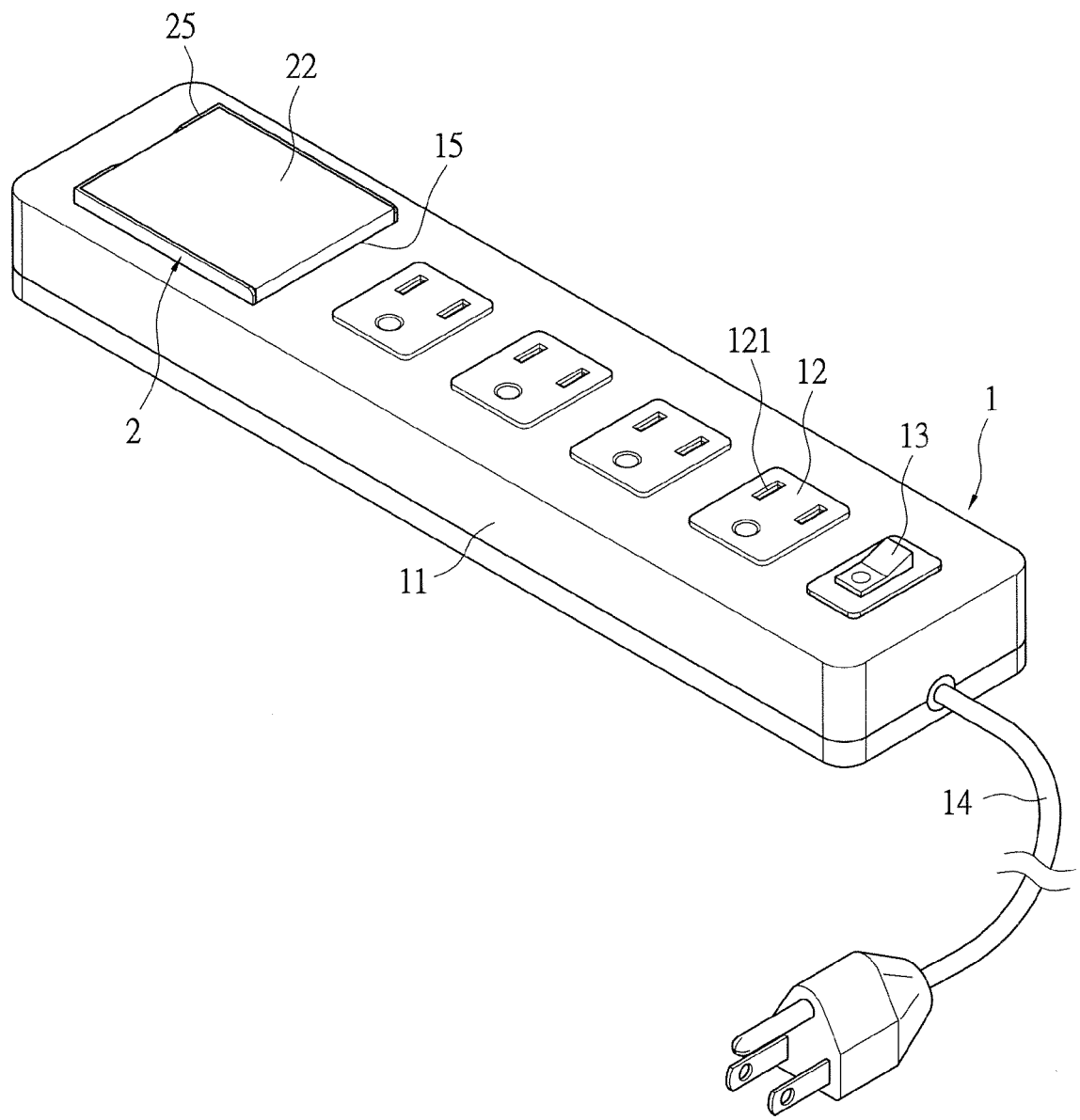
FIG. 2 shows an isometric view of a composite power strip of the first embodiment.

For the first embodiment shown in FIGS. 1 and 2, a composite power strip has a housing 1, which includes a body 11 having at least one electrical outlet 12 and an on/off switch 13. The electrical outlet 12 has slots 121 and a conductive strip therein (not shown). The electrical outlet 12 is not restricted in type and can be any electrical connector. A power cord 14 is electrically connected to the electrical outlet 12 for propagating electrical current from the power source to the electrical outlet 12. A charging device 2 is removably attached to a receiving compartment 15 formed upon the body 11. The receiving compartment 15 is sized according to the dimensional aspect of the charging device 2. The receiving compartment 15 has at least one first terminal 16 for mating electrically to an at least one second terminal 23 on the charging device 2. The first terminal 16 can be located on the side or bottom surface of the receiving compartment 15 and is connected electrically to the power cord 14. Thereby, the charging device 2 can connect electrically to the interior electrical circuitry of the housing 1 and receive the power accordingly.

Figure 3:
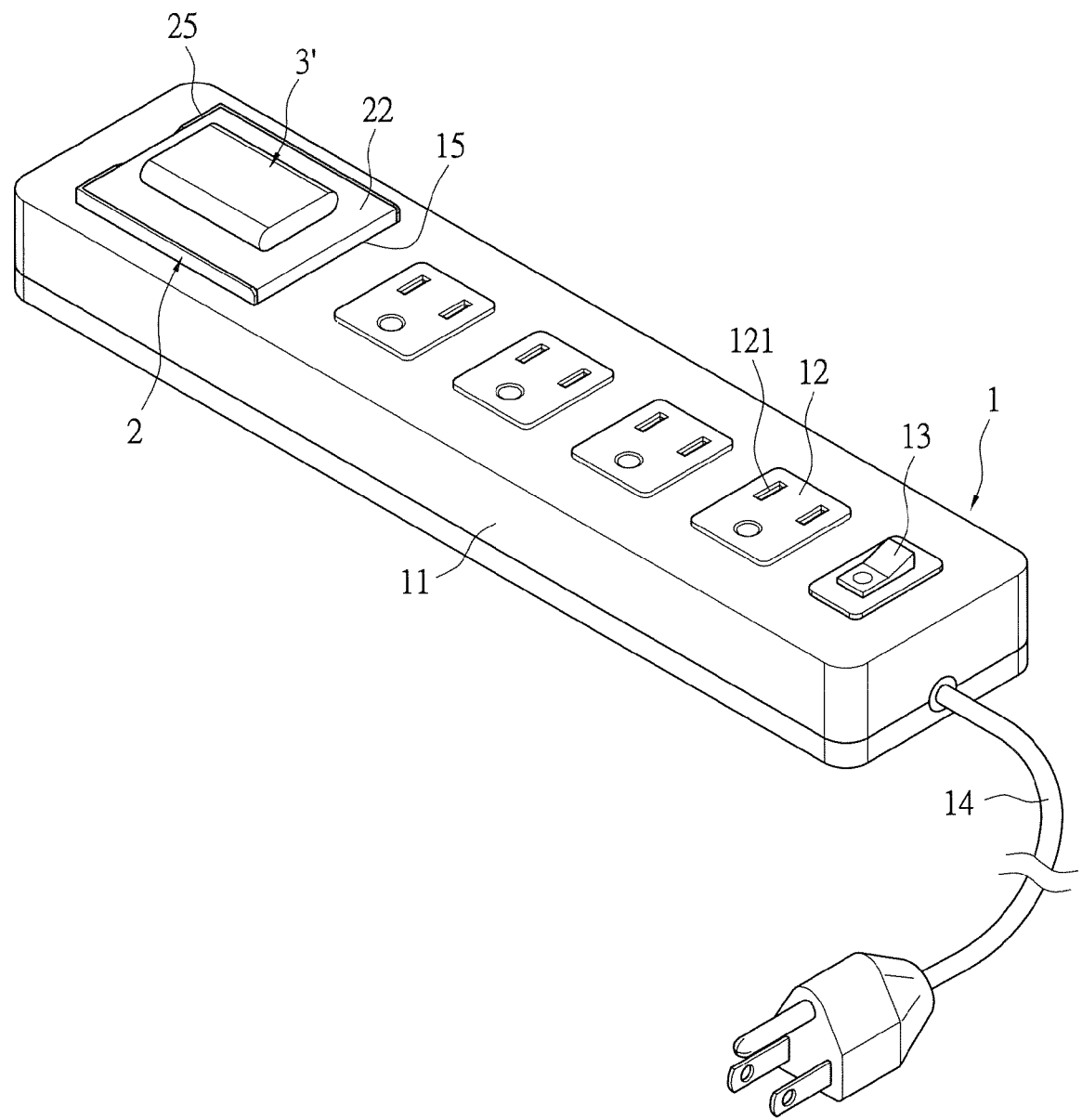
FIG. 3 shows a schematic view of a composite power strip in use of the first embodiment.

As depicted in FIG. 1, the charging device 2 of the instant disclosure has at least one electrical interface 21 for charging using cable connection and a transmitter 22 for charging wirelessly. Among others the electrical interface 21 can be a USB connector, IEEE 1394 connector, HDMI connector, A/V connector, or DC connector. Meanwhile, the charging device 2 has a square-shaped body, but can alternatively be formed in many shapes and sizes according to the operation requirement. As shown in FIGS. 1 to 3, the charging device 2 has a recess 25 for receiving the removable transmitter 22. The transmitter 22 and the recess 25 have a first and second electrical contact 221 and 251 respectively. The first electrical contact 221 can connect electrically to the second electrical contact 251, thus allowing the transmitter 22 to be electrically connected to the internal electrical circuitry of the charging device 2. The charging device 2 can further includes a retrievable cord 26 having a power connector 27 on the free end. A built-in transformer, signal light, sensor, timer, or GCFI (ground fault circuit interrupter) may also be included in the charging device 2.

Notably, the transmitter 22 can also be integrally fixed to the charging device 2 as depicted in FIGS. 5, 6, 8, and 9.

Figure 7:
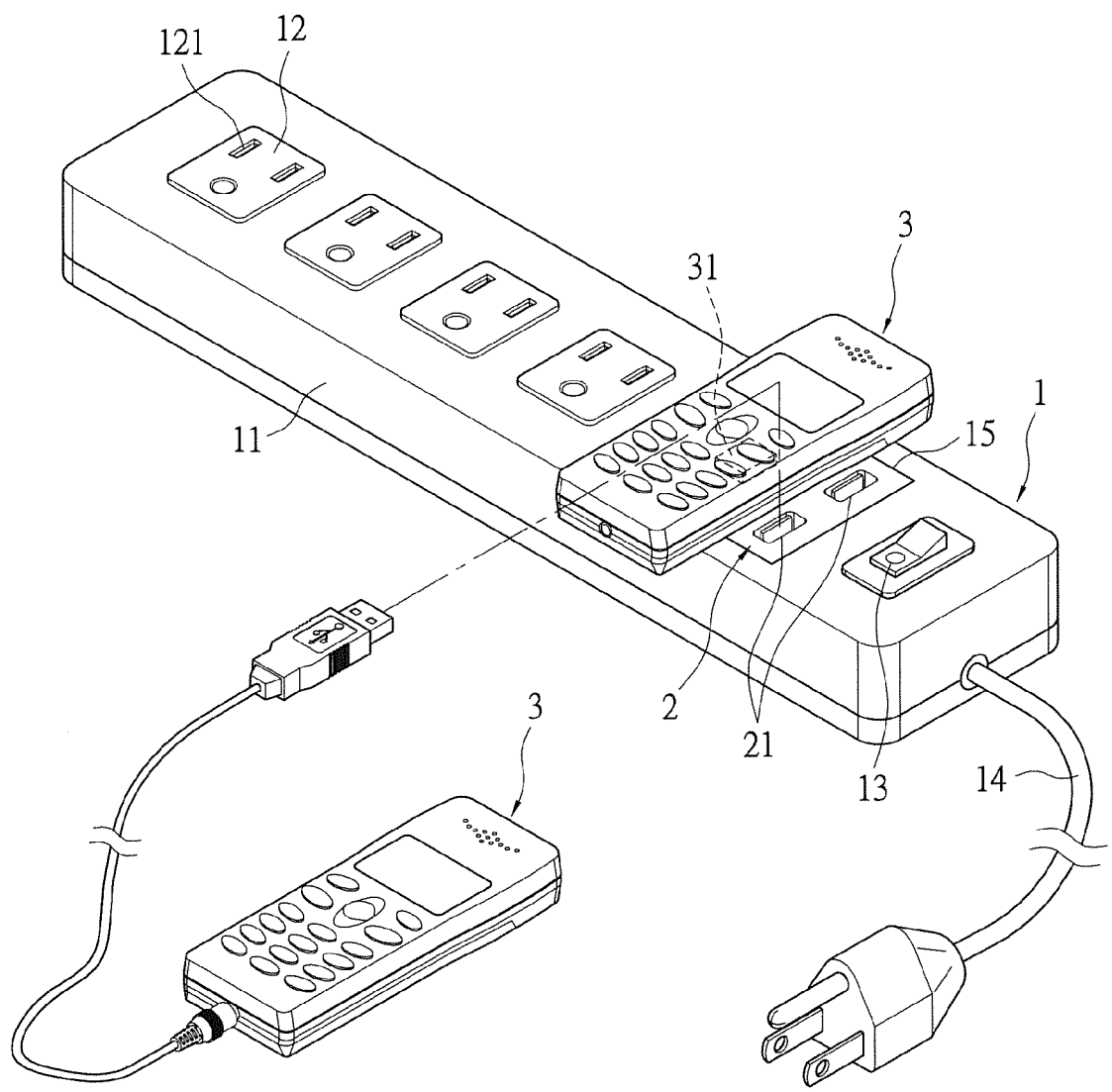
FIG. 7 shows a schematic view of a composite power strip in use of the third embodiment.

In use, a battery 3' having a charging receiver can be placed on the charging device 2 as depicted in FIG. 3. Then, the battery 3' is charged via electromagnetic induction, cord-and wire-free. FIG. 7 shows another example, where an electronic device 3, such as a mobile phone, can be recharged by connecting electrically to the electrical interface 21 via a connection cable. On the other hand, if the mobile phone includes a charging receiver 31, the mobile phone can be placed on the charging device 2 for charging wirelessly.

Figure 4:
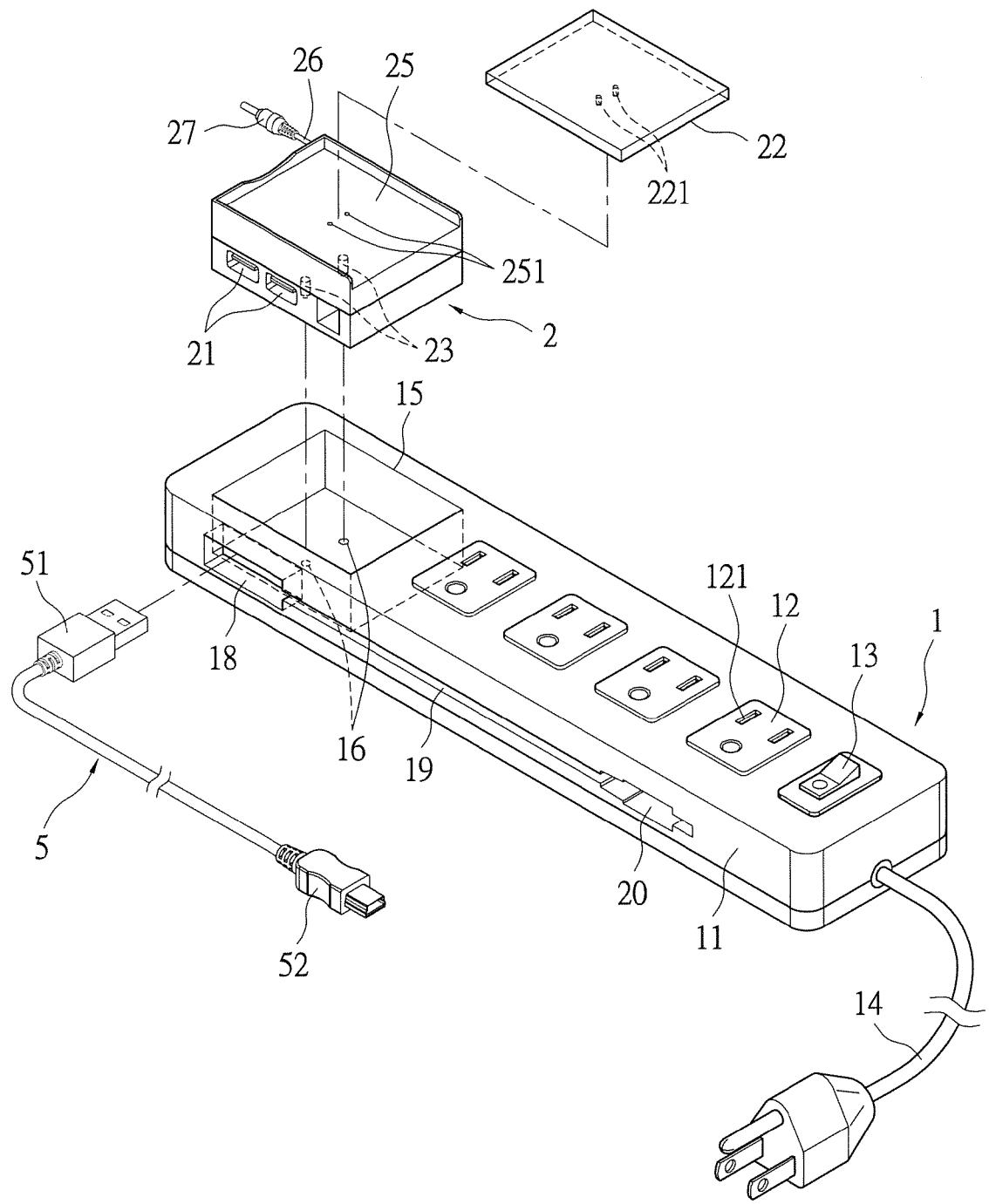
FIG. 4 shows an exploded view of a composite power strip of the second embodiment.

According to another embodiment, the composite power strip can further include a cable 5 to provide more secured connection as shown in FIG. 4. The cable 5 is connected to a first connector 51 on one end and a second connector 52 on the other end. Moreover, a receiving space 18 is formed near an edge of the body 11 and corresponded to the position of the electrical interface 21 of the charging device 2, so that the first connector 51 can be inserted into the receiving space 18 and electrically connected to the electrical interface 21 of the charging device 2. To charge an electronic device, the first connector 51 of the cable 5 is inserted into the receiving space 18 and electrically connected to the electrical interface 21 of the charging device 2. Meanwhile, the second connector 52 of the cable 5 is electrically connected to the electronic device, such as a mobile phone, for charging operation. Functionally, the receiving space 18 shelters the first connector 51 to protect the cable connection. Furthermore, a first slot 19 and a second slot 20 can further be formed on the body 11 for receiving the cable 5 and the second connector 52 while not in use. Thus, when the cable 5 and second connector 52 are not in use, the user needs not to remove the cable 5 and the second connector 52 from the body 11 because the cable 5 and the second connector 52 can be stored in the first slot 19 and the second slot 20 of the body 11 without occupying a large space. Moreover, when the user needs to use the cable 5, the user does not need to find the cable 5 somewhere. That is very convenient for the user. Preferably, the receiving space 18 and the second slot 20 are in communication with the first slot 19, and a shape of the second slot 20 is corresponded to a shape of the second connector 52.

Figure 5:
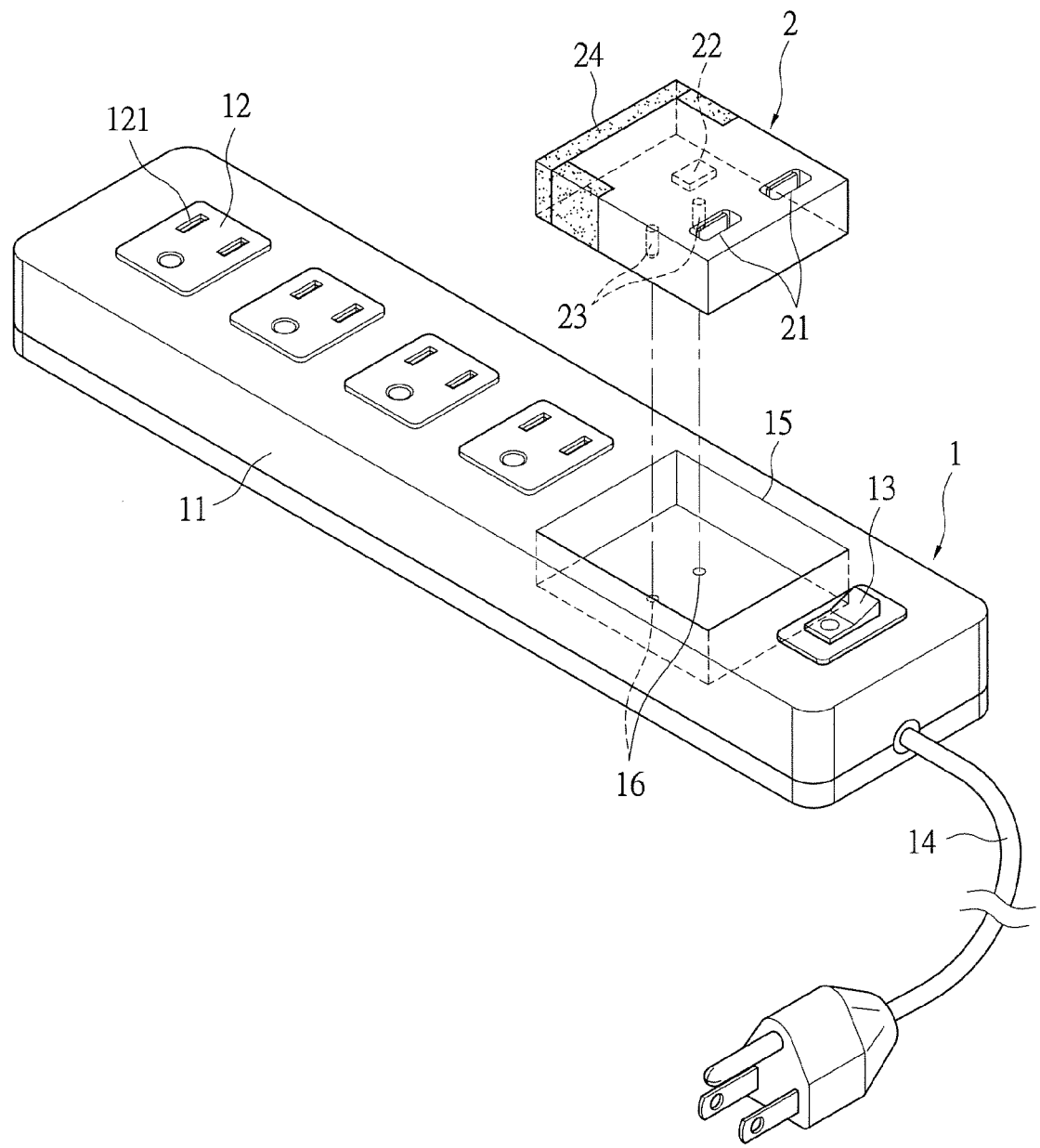
FIG. 5 shows an exploded view of a composite power strip of the third embodiment.
Figure 6:
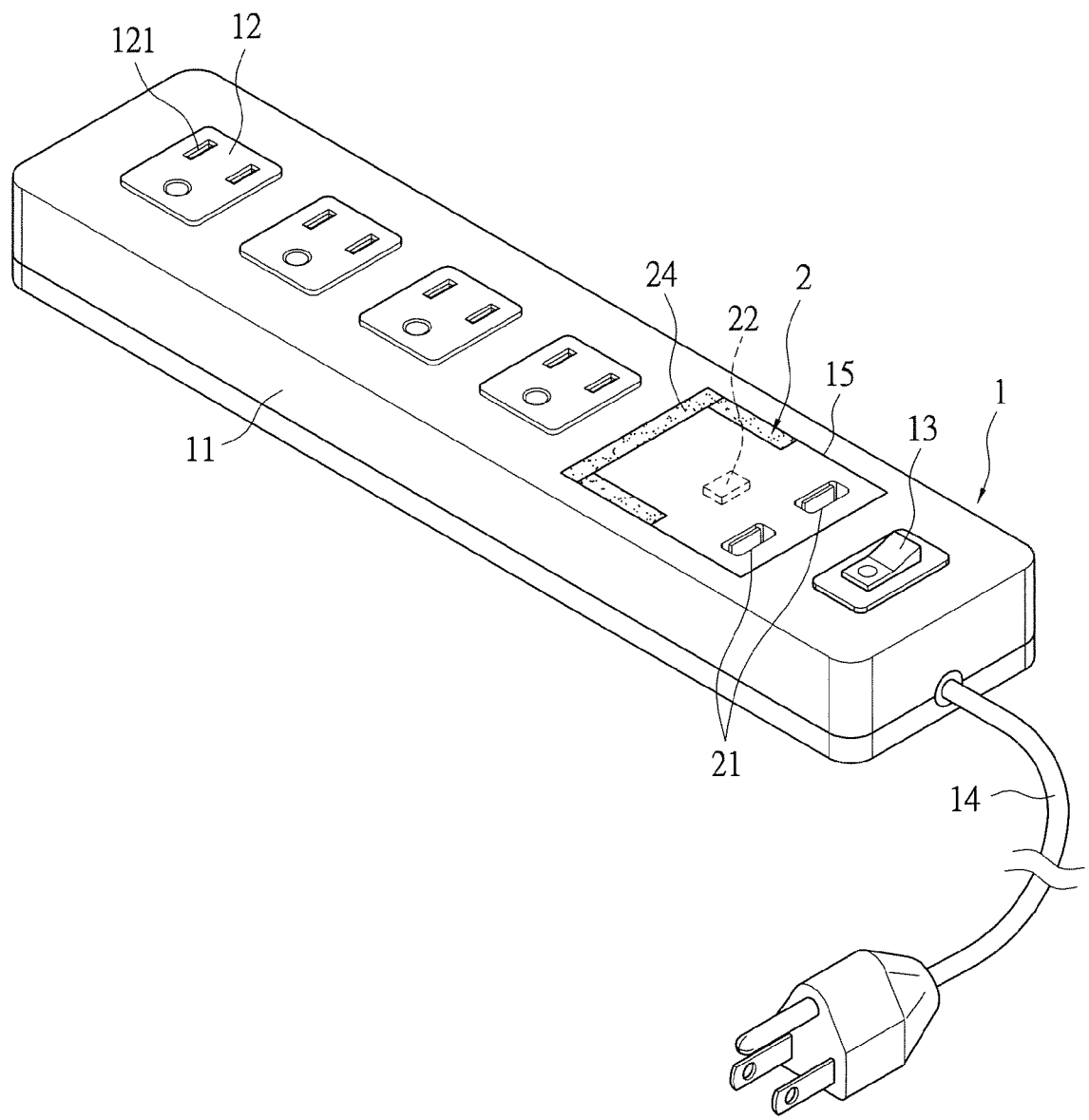
FIG. 6 shows an isometric view of a composite power strip of the third embodiment.

To secure the electronic device on the charging device 2 while charging, the charging device 2 can further include at least one magnetic member 24 as shown in FIGS. 5 and 6 for a third embodiment. While the electronic device is placed on the charging device 2, the magnetized charging device 2 will attract the electronic device having an outer casing made of magnetic material to better secure the electronic device while charging.

Figure 8:
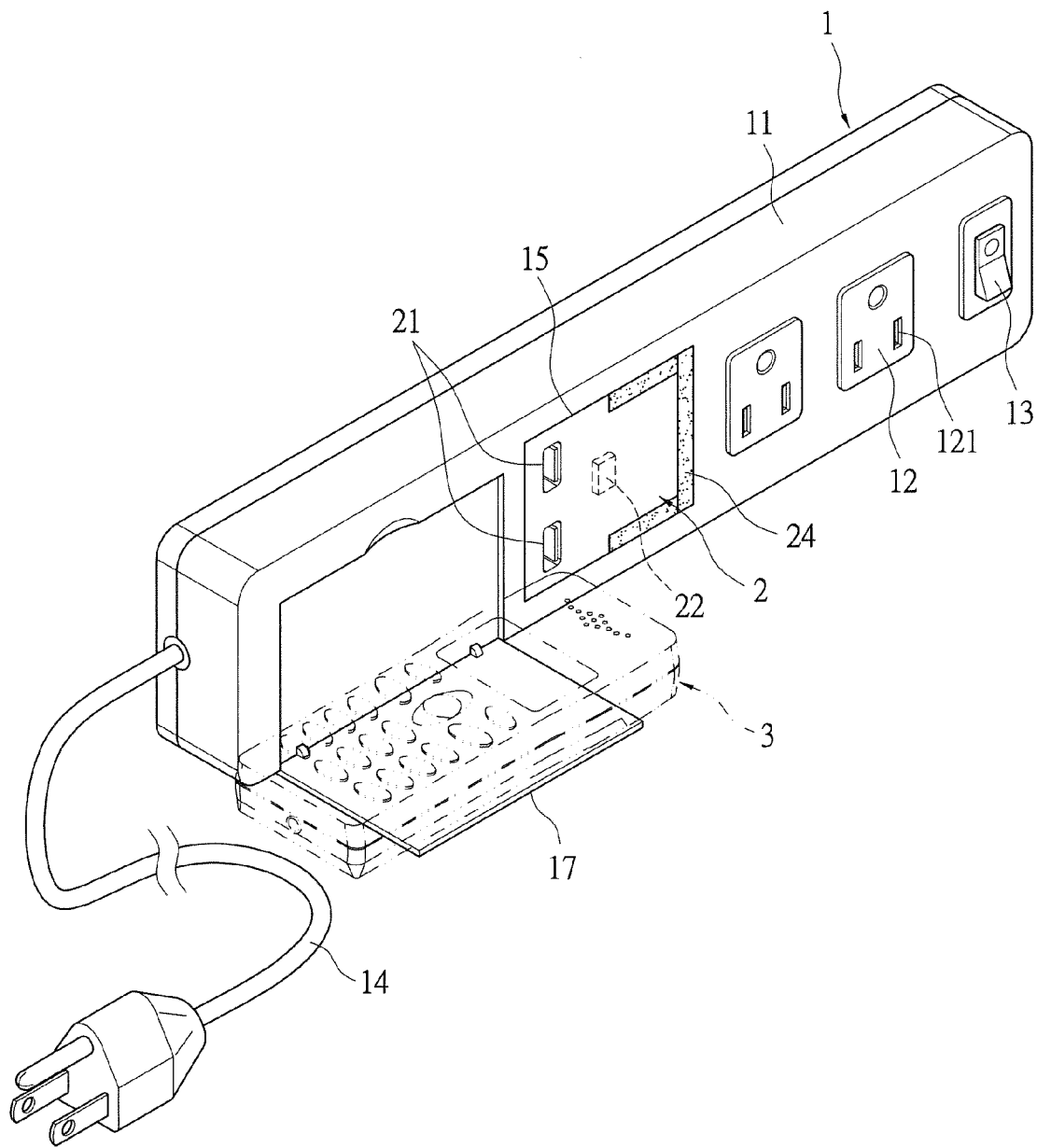
FIG. 8 shows an isometric view of a composite power strip of the fourth embodiment.

In a fourth embodiment as shown in FIG. 8, the power strip can further include a support plate 17. Namely, the body 11 of the housing 1 comprises the hinged support plate 17 that radially releases for resting the electronic device 3.

Figure 9:
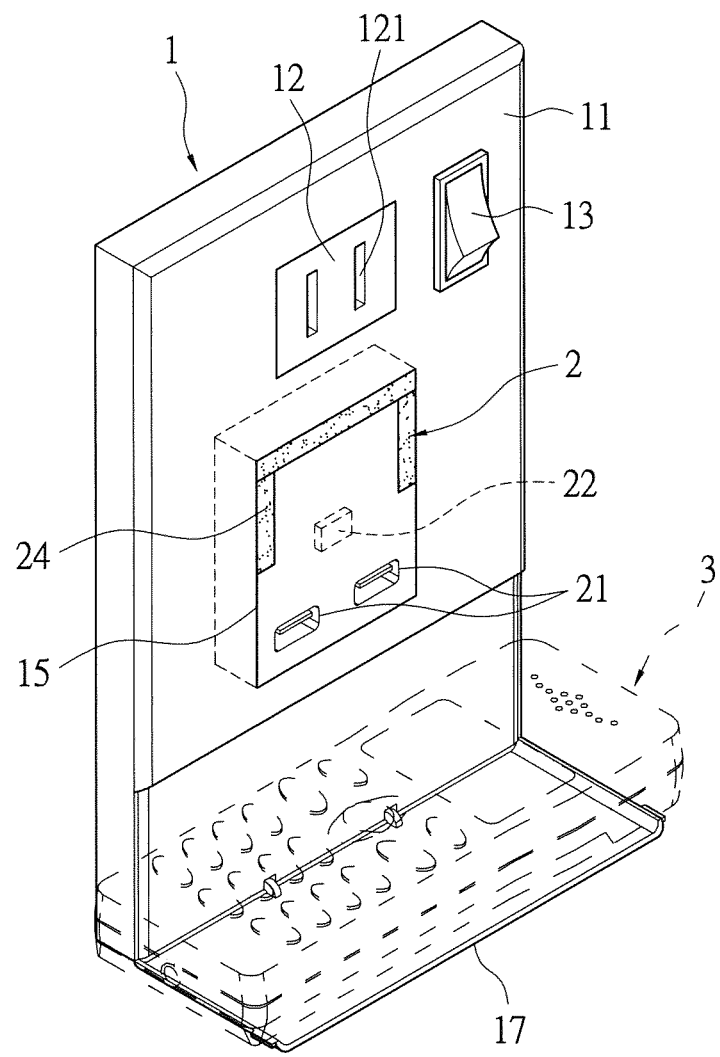
FIG. 9 shows an isometric view of a composite wall outlet assembly of the fifth embodiment.

In a fifth embodiment, as shown in FIG. 9, the instant disclosure provides a composite wall outlet assembly having a charging device 2. For the composite wall outlet assembly, the body 11 of the housing 1 is rectangular-shaped, but can alternatively be formed in any shape. The body 11 is made of one or more plate and secured to the wall. The body 11 can also include a hinged support plate 17 that radially releases for resting the electronic device 3.

In summary, the charging device 2 and associated electrical appliances of the instant disclosure provide charging using cable connection and wireless option. The option of using USB type connector for the electrical interface 21 offers a standard charging mode of using cable connection. Furthermore, more than one electronic device can be charged simultaneously for flexibility and convenience.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A composite power strip, comprising:
a housing having a body, wherein
the body has at least one electrical outlet which is electrically connected to a power cord, the body forms a receiving compartment, which has at least one first terminal;
a charging device having at least one electrical interface, wherein the charging device is removably attached to and disposed in the receiving compartment, and the charging device has at least one second terminal for connecting electrically to the first terminal;
a wireless charging transmitter removably attached to and disposed in a recess on the charging device; and
a cable having a first connector on one end and a second connector on another end, a receiving space is formed on the body to accommodate the first connector for connecting electrically to the electrical interface.

2. The composite power strip of claim 1, wherein the body further comprises a first slot and a second slot formed on an edge thereof to accommodate the cable and the second connector therein.

3. The composite power strip of claim 2, wherein the receiving space and the second slot are in communication with the first slot.

4. The composite power strip of claim 2, wherein a shape of the second slot is corresponded to a shape of the second connector.

5. The composite power strip of claim 2, wherein the transmitter has a first electrical contact for mating electrically to a second electrical contact on the recess.

6. The composite power strip of claim 1, wherein the electrical interface is a USB type connector.

7. The composite power strip of claim 1, wherein the receiving compartment is formed by creating a cavity on the upper surface of the body.

8. The composite power strip of claim 1, wherein the charging device further comprises an interior electrical circuitry, which is electrically connected to the electrical interface and the transmitter.

* * * * *